US012608573B2

(12) United States Patent
    Dayde

(10) Patent No.: US 12,608,573 B2
(45) Date of Patent: Apr. 21, 2026

(54) FRAMED CARD OR EXCAVATION EFFECT ON CARD

(71) Applicant: Giesecke+Devrient ePayments GmbH, Munich (DE)

(72) Inventor: Aurelie Dayde, Munich (DE)

(73) Assignee: Giesecke+Devrient ePayments GmbH, Munich (DE)

( * ) Notice: Subject to any disclaimer, the term of this patent is extended or adjusted under 35 U.S.C. 154(b) by 0 days.

(21) Appl. No.: 19/016,445

(22) Filed: Jan. 10, 2025

(65) Prior Publication Data

US 2025/0225357 A1     Jul. 10, 2025

(30) Foreign Application Priority Data

Jan. 10, 2024    (EP) .................................... 24151236

(51) Int. Cl.
    *G06K 19/04*          (2006.01)
(52) U.S. Cl.
    CPC .................................. *G06K 19/041* (2013.01)
(58) Field of Classification Search
    CPC .................................................... G06K 19/041
    USPC ........................................................ 235/488
    See application file for complete search history.

(56) References Cited

U.S. PATENT DOCUMENTS

| | | | |
|---|---|---|---|
| 2,802,418 A | 8/1957 | Carver et al. | |
| 5,700,037 A | 12/1997 | Keller | |
| 9,836,684 B2 | 12/2017 | Finn | |
| 10,083,383 B1 | 9/2018 | Herrington et al. | |
| 10,363,769 B1 | 7/2019 | Herrington et al. | |
| 11,741,326 B2 | 8/2023 | Dellinger et al. | |
| 12,194,768 B2* | 1/2025 | Tziovaras | B42D 25/455 |
| 2009/0269519 A1 | 10/2009 | Lazzerini | |
| 2019/0283484 A1 | 9/2019 | Herrington | |
| 2020/0104549 A1 | 4/2020 | Russell-Clarke | |
| 2021/0253879 A1* | 8/2021 | Hardwick | C08J 7/0427 |
| 2022/0314681 A1* | 10/2022 | Rauch | B42D 25/445 |
| 2024/0217258 A1* | 7/2024 | Sharma | B42D 25/378 |
| 2024/0253384 A1* | 8/2024 | Calmet | B42D 25/387 |
| 2024/0308191 A1* | 9/2024 | Pudleiner | B32B 27/365 |
| 2024/0399781 A1* | 12/2024 | Fuchsbauer | B42D 25/36 |
| 2025/0091332 A1* | 3/2025 | Pudleiner | B32B 37/185 |
| 2025/0187036 A1* | 6/2025 | Pittet | C09D 11/037 |
| 2025/0225357 A1* | 7/2025 | Dayde | G06K 19/041 |
| 2025/0229566 A1* | 7/2025 | Calmet | B42D 25/333 |

FOREIGN PATENT DOCUMENTS

| | | |
|---|---|---|
| CN | 113 874 221 B | 12/2022 |
| CN | 110276432 A | 4/2024 |
| DE | 41 01 301 A1 | 7/1992 |
| EP | 3314538 B1 | 3/2021 |
| EP | 3362248 B1 | 6/2023 |
| JP | 2002 137579 A | 5/2002 |
| WO | 2005/032831 | 4/2005 |

* cited by examiner

*Primary Examiner* — Allyson N Trail

(74) *Attorney, Agent, or Firm* — LNK LAW, PLLC

(57)                ABSTRACT

The present disclosure discloses a card having an inclined or excavated edge surrounding the card or part of the surface of the card. At least a part of the inclined or excavated edge or part of the surface of the card may be coloured or in white. The revealed part may particularly be formed by means of a printing process or alternatively by way of superimposed foil layers.

11 Claims, 3 Drawing Sheets

A

B

FRAMED CARD OR EXCAVATION EFFECT ON CARD

CROSS REFERENCE TO RELATED DOCUMENT(S)

This application claims priority to EP Application No. EP 24151236.7 entitled "Framed Card Or Excavation Effect On Card" and filed on Jan. 10, 2024, which application is incorporated by reference in its entirety.

TECHNICAL FIELD

The present disclosure refers to documents or security documents made in the form of a card.

BACKGROUND

Documents or security documents are known to be made in the form of a card. Some examples for such documents are business cards or cards comprising insurance details, e.g. to be handed over in case of a car accident. Some examples for security documents are chip cards or smartcards, credit cards, banking cards, health care cards, personal identity cards, loyalty cards or transport cards being included in loyalty cards.

EP 3314538 B1 discloses an example of such a data carrier in the form of a card. The card, in a cross section from top to down, comprises layers of same or different colors. In this cross section, an outer edge (left and right) of the pack of layers comprises an inclined shape or a rounded shape. Looking on top of the card, these different layers of same or different colors are visible at the inclination or rounding.

U.S. Pat. No. 11,741,326 B2 illustrates a payment card, wherein its four edge walls include an enhanced edge pattern, such as including a plurality of projections and depressions, for example embossments, that are regularly or irregularly allocated along the edge.

EP 3362248 B1 discloses a card frame, including a pocket to accommodate an electronic component, such as a chip. The card frame includes an upper surface and a second and third surface, the second and third surfaces being recessed from the first surface at a first depth and a second depth.

U.S. Pat. No. 10,083,383 B1 shows a credit card with a slot, embossments or other deviations from a flat smooth surface, that may be arranged on a top surface of the card to facilitate gripping, when the card is contained in a pocket. Further, a section of an edge of the card, intended for insertion into the pocket first, may feature a stepped profile to facilitate insertion. U.S. Pat. No. 10,363,769B1 and CN 110276432 A are showing similar cards.

SUMMARY

A card document according to the features of the independent claims is described herein. Further embodiments are evident from the dependent claims and from the following description.

According to an aspect of the present disclosure, a card document is provided, comprising one or more layers and featuring a top plane, a bottom plane and at least one stepped structure, wherein the stepped structure comprises at least one step originating from the top plane or the bottom plane of the card document, thus locally reducing a material thickness of the card document, wherein a contour that separates the stepped structure from the respective top plane or bottom plane is closed in itself and wherein the at least one step is at least partially featuring a step color different from a plane color of at least one of the top plane or the bottom plane.

This way the card document obtains a distinct and nice visual appearance helping to quickly access the card document in various situations. The stepped structure further improves handling, for example in case of bad visual conditions, in terms of a tactile/haptic feature. The stepped structure also helps to guide the card document into a pocket.

According to an aspect of the present disclosure, a card document is provided, comprising one or more layers and featuring a top plane, a bottom plane and at least one stepped structure, wherein the stepped structure comprises at least one step originating from the top plane or the bottom plane of the card document, thus locally reducing a material thickness of the card document, wherein a contour that separates the stepped structure from the respective top plane or bottom plane is closed in itself and wherein the at least one step is at least partially featuring a step color different from a plane color of at least one of the top plane or the bottom plane, the step color exhibiting luminescence.

Especially in the case of bad visual conditions or even in the dark the luminescence visually guides the user of the card document, for example to put the card document into a pocket, such as a purse. It also helps to find the card document in case of loss.

According to an aspect of the present disclosure, a card document is provided, comprising one or more layers and featuring a top plane, a bottom plane and at least one stepped structure, wherein the stepped structure comprises at least one step originating from the top plane or the bottom plane of the card document, thus locally reducing a material thickness of the card document, wherein a contour that separates the stepped structure from the respective top plane or bottom plane is entirely surrounded by the top plane or the bottom plane from which it originates, and wherein a bottom of the stepped structure is directly exposed to the environment.

This way, the bottom of the stepped structure may serve as an haptic feature, for example for person not being able to see the card document, to identify, handle and orient the card document. Further, aesthetics of the card document are improved, which generally applies to all aspects and embodiments of the present disclosure.

According to an aspect of the present disclosure, a card document is provided, comprising one or more layers and featuring a top plane, a bottom plane and at least two stepped structures, wherein a first stepped structure comprises at least one step originating from the top plane and a second stepped structure comprises at least one step originating from the bottom plane of the card document, whereby a material thickness of the card document is locally reduced by each of the first and second stepped structure, and wherein a contour that separates each of the first and second stepped structure from the respective top plane or bottom plane from which it originates is entirely surrounded by the respective top plane or bottom plane, and wherein the first stepped structure and the second stepped structure comprise a different geometry.

In this case, the different geometry may for example be used to distinguish between the top plane and the bottom plane, which means a front side or backside respectively, of the card document without visual inspection.

According to an aspect of the present disclosure, a card document is provided comprising, one or more layers and featuring a top plane, a bottom plane and at least one stepped structure, wherein the stepped structure comprises at least one step originating from the top plane or the bottom plane of the card document, thus locally reducing a material thickness of the card document, wherein a contour that separates the stepped structure from the respective top plane or bottom plane, at the same time, is forming part of an edge of the card document, and wherein the card document further comprises an electronic element on the top plane or the bottom plane, wherein a shortest distance between the contour and the electronic element is less than three quarters of a maximum extension of the card document.

In an embodiment, the shortest distance between the contour and the electronic element is less than half of the maximum extension of the card document.

As the stepped structure is forming a tactile or haptic feature and since the electronic element (e.g. chip) is arranged in a predetermined distance from the edge, and location of the electronic element can be acquired without visually inspecting the card document.

In an embodiment, the card document comprises a plurality of layers and the at least one step is at least partially featuring a step color different from a plane color of at least one of the top plane or the bottom plane, which is due to the step being at least partially formed by a layer of the card document featuring a layer color that is different from a layer color of a layer at least partially forming the respective top plane or bottom plane. By using layers of different colors the step color and plane color can be easily achieved.

In an embodiment, the layer color of the layer at least partially forming the step is at least partially achieved by a material color of the layer. This way, additional manufacturing steps such as coloring can be avoided which significantly reduces the effort to manufacture the card document.

In an embodiment, the step color is at least partially achievable by a coating process. This way, another simple and efficient way of achieving the step color is provided, so that the card document can be manufactured flexibly.

In an embodiment, a logo is formed by the stepped structure. This way, the stepped structure may be additionally used for commercial purposes or any kind of design.

In an embodiment, the stepped structure at least partially comprises a surface roughness being different from a surface roughness of the top plane or bottom plane. This enhances the possibility of haptically identifying the stepped structure, and may even be used as a security feature. Such a security feature could be based on a predetermined surface roughness or on a ratio full surface roughness of the stepped structure and at least one of the planes.

In an embodiment, the stepped structure is manufacturable by a material removing process. In an embodiment, the stepped structure is manufacturable by a forming process. Thus, the variety of possibilities to flexibly manufacture the card document is provided.

In an embodiment, a card document includes one or more layers and features a top plane, a bottom plane and at least two stepped structures. A first stepped structure includes at least one step originating from the top plane and a second stepped structure includes at least one step originating from the bottom plane of the card document. The material thickness of the card document is locally reduced by each of the first and second stepped structure, and a contour that separates each of the first and second stepped structure from the respective top plane or bottom plane from which it originates is entirely surrounded by the respective top plane or bottom plane. The first stepped structure and the second stepped structure comprise a different geometry.

In an embodiment, a card document includes one or more layers and features a top plane, a bottom plane and at least one stepped structure. The stepped structure includes at least one step originating from the top plane or the bottom plane of the card document, thus locally reducing a material thickness of the card document. A contour that separates the stepped structure from the respective top plane or bottom plane, at the same time, is forming part of an edge of the card document. The card document further includes an electronic element on the top plane or the bottom plane. The shortest distance between the contour and the electronic element is less than three quarters of a maximum extension of the card document.

The present disclosure provides one or more embodiments which result in making a card document look better and easier to be handled.

The advantages of the different aspects described above and apply to all the different aspects and embodiments disclosed.

BRIEF DESCRIPTION OF THE DRAWINGS

The present disclosure will hereinafter be described in conjunction with the following figures, wherein.

DETAILED DESCRIPTION

Figure 1:
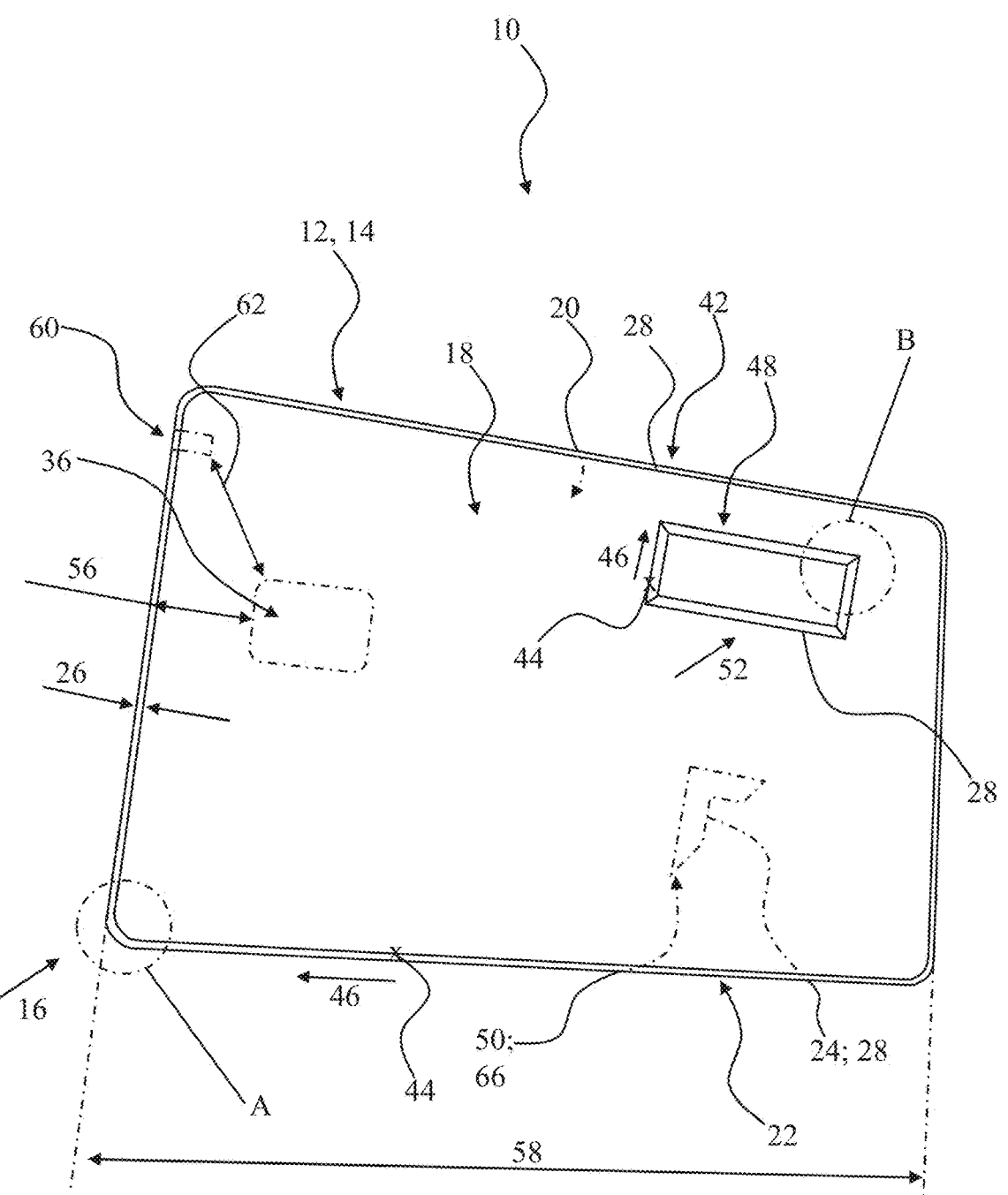
FIG. 1 shows a card document in different independent but compatible embodiments, in a viewing direction onto a top plane of the card document.

FIG. 1 shows a card document 10. The card document 10 comprises one or more layers 12, 14, and can be seen with reference to FIG. 2, wherein detail A of FIG. 1 is illustrated, depicted from a viewing direction 16 as indicated in FIG. 1.

Figure 2:
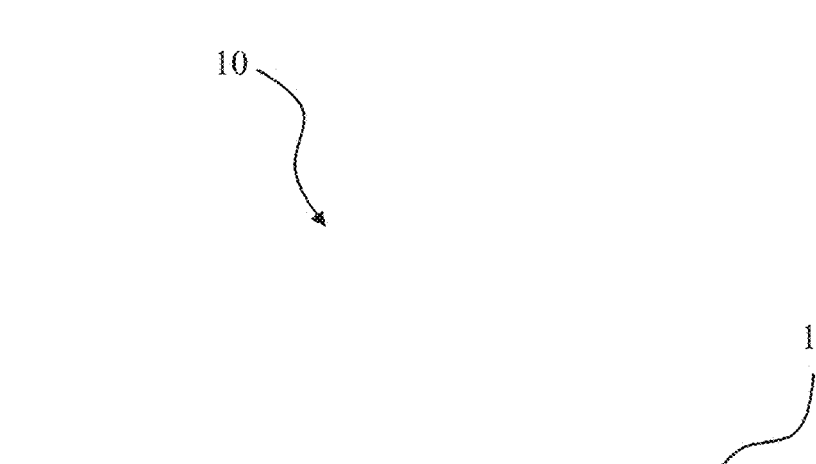
FIG. 2 shows detail A of FIG. 1.
Figure 2:
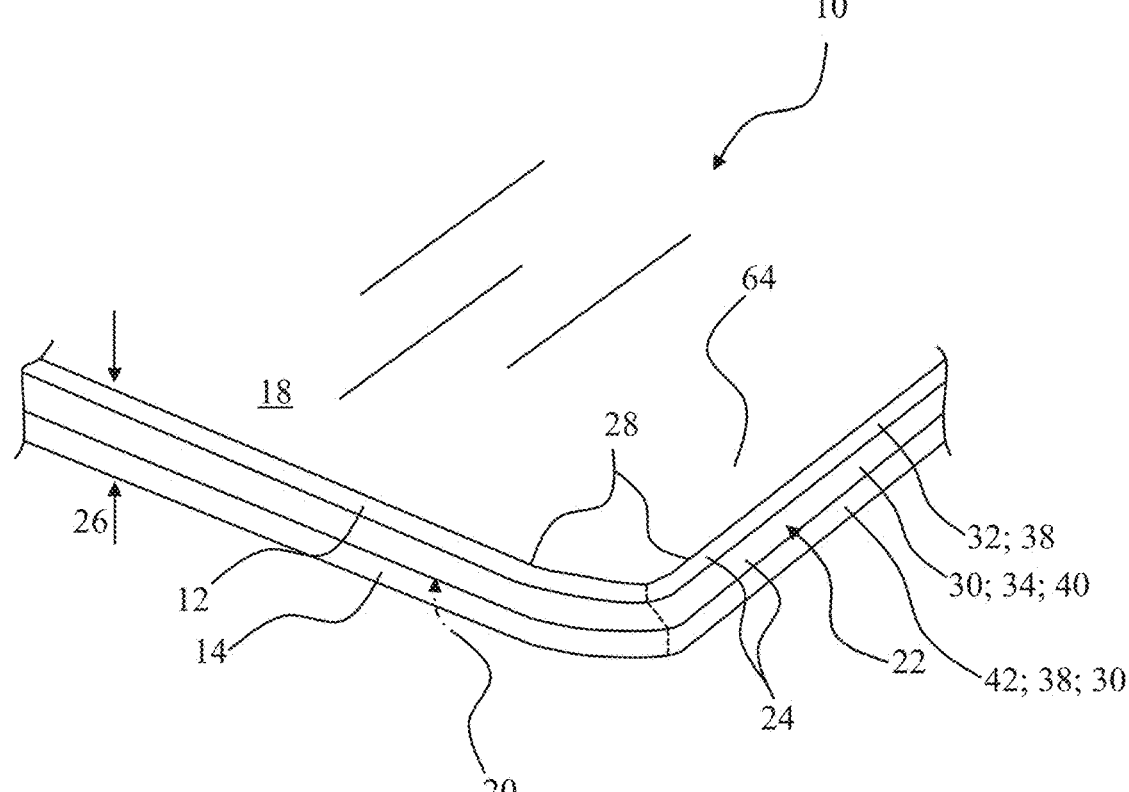

Merely as an optional example, the card document 10 shown in FIGS. 1 and 2 has two layers 12, 14. However, unless indicated otherwise, all the following applies also to card documents 10 with only one layer of more than two layers.

The card document 10 is featuring a top plane 18 and a bottom plane 20. The bottom plane 20 is hidden in FIG. 1, because the view is isometrically onto the top plane 18. In the illustrated example, the top plane 18 is comprised by layer 12 and the bottom plane 20 is comprised by layer 14. In other examples, wherein there is only one layer, the one layer would comprise both the top plane 18 and the bottom plane 20. In other examples, wherein there are more than two layers, a top layer comprises the top plane 18 and a bottom layer comprises the bottom plane 20.

The card document 10 shown in FIG. 1 comprises at least one stepped structure 22, 48, 50. The stepped structure 22, 48, 50 may comprise at least one step 24 originating from the top plane 18 or the bottom plane 20 of the card document 10, thus locally reducing a material thickness 26 of the card document 10. The stepped structure 48 may originate from the top plane 18 and the stepped structure 50 may originate from the bottom plane 20 and both stepped structures 48, 50 will be described in more detail further down.

First, focus is put on the stepped structure 22, shown in more detail in FIG. 2. The stepped structure 22 comprises a step 24 originating from the top plane 18. Optionally, the card document 10 may comprise an additional layer arranged below layer 14 in FIG. 2 (therefore not shown) that may be designed, for example, analogue the layer 12 or different. In that case, there may be an additional stepped structure originating from the bottom plane, that would be comprised by the additional layer in that example.

Turning back to the examples shown in FIG. 2, there is a contour 28 that separates the stepped structure 22 from the respective top plane 18. The contour 28 may be closed in itself, as can be seen in FIG. 1.

The at least one step 24 may at least partially feature a step color 30 different from a plane color of at least one of the top plane 18 or the bottom plane 20. The step color 30 may, for example, be present in region 32 and/or 34, wherein FIG. 2 illustrates the step color 30 exemplarily in region 34.

Generally, the top plane 18 and the bottom plane 20 are the two largest planes of the card document 10. The term "plane", in this context, is not only to be understood in a geometrically strict manner. This means, the card document 10 may even feature elements (such as, e.g., security features) protruding from the top plane 18 or bottom plane 20 in some embodiments, all compatible with the present disclosure. In such cases, the top plane or bottom plane are referred to as virtual and geometrically ideal planes, that are hidden inside the volume of the card document 10 and feature a maximum distance from each other in the direction of the material thickness 26 (FIG. 1).

Merely as optional examples and shown in FIG. 1, the top plane 18 may comprise an electronic element 36 (such as a chip), an identification picture (not shown) of a document holder or printings (not shown) to identify a document issuer. The bottom plane 20 may comprise a magnetic strip, a signature field or additional information required to use the card document (all of these optional features not shown).

The card document 10 may be a personal identity card document or a payment card document, respectively, but merely in terms of examples.

Figure 3:
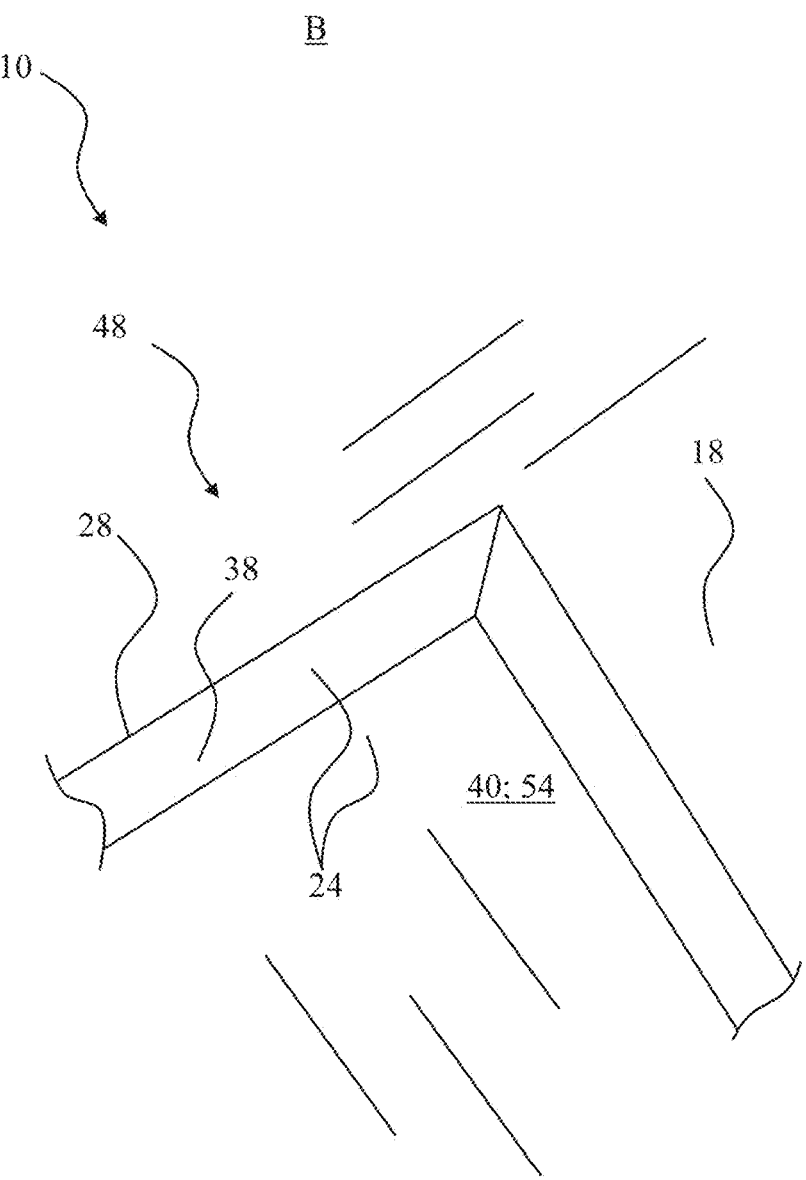
FIG. 3 shows detail B of FIG. 1.

A step 24 comprises at least one declined section 38, digging into the material of the card document 10 (such as plastics), which means it locally reduces the material thickness 26 of the card document 10, as can be seen in FIGS. 2 and 3, for example. Each step 24 starts or ends with such a declined section 38. A degree of declination can be freely chosen and may range, for example, in an interval [0°;90°], [20°;90°], [30°;90°] or [45°;90°]. Further, each step 24 comprises at least one plateau section 40, wherein plateau means the plateau section 40 is at least less declined than the declined section 38 and may even extend at a constant level of material thickness 26 of the card document 10 (corresponding to a declination degree of 0°). The latter is shown as an example in FIGS. 2 and 3. A step 24 and its declined and plateau section(s) 38, 40, respectively, may have various shapes, such as a planar or curved shape.

Different steps 24 may follow each other in the manner of a chain, for example in a regular or irregular pattern, which means the declined and plateau section(s) 38, 40 of subsequent steps 24 may be identic or different, respectively. For example and optionally, an edge 42 of the card document 10 may also represent a declined section 38, as shown in FIG. 2, and may optionally feature the step color 30. In FIG. 2, an additional plateau section (not shown) may follow the edge 42, for example in the manner of plateau section 40 illustrated in FIG. 2 or even on the backside of the illustrated plateau section 40 in FIG. 2 (indicated by bottom plane 20 and thus not visible). The step color 30 may also be present at the edge 42 or the declined section 38 or an optional and not illustrated additional plateau section.

One or more steps 24 are forming the stepped structure 22, wherein the contour 28 separates the stepped structure 22 from the respective top or bottom plane 18, 20. The contour 28 is represented by the entirety of edges of first steps formed directly with the respective top or bottom plane 18, 20. There may be a plurality of identic or different stepped structures 22 that are, respectively, limited by different contours 28 which are not connected to each other. A stepped structure 22 may also be referred to as an excavation.

A contour 28 being closed in itself herein means that, starting at any point of the contour 28 as a starting point 44, the contour 28 may be followed (e.g. by a tactile instrument, a finger or just visually) continuously in one direction 46, which leads back to the starting point 44 without interruption. Such starting points 44 and directions 46 are illustrated in FIG. 1, only by means of examples for better illustration.

Regarding a step 24 or steps 24, the term "originate from" refers to the respective top or bottom plane 18, 20, from where a first step (e.g. of a chain of steps) of a stepped structure 22 starts digging into the card material. In other words, the steps 24 originate from where the contour 28 is located. This means, if there is a first step starting at the respective top plane 18 or bottom plane 20 followed by one or more steps 24 lying deeper inside the material of the card document 10 (which may be regarded as a chain of steps 24), all these steps 24 originate from the same top plane 18 or bottom plane 20, because the first step (in the chain) starts at the respective plane. This implies that a stepped structure 22, 48, 50 originates from the same plane as the at least one/first step 24 forming the contour 28 with the respective plane. If there is a plurality of stepped structures 22, 48, 50, as exemplarily shown in FIG. 1, all these stepped structures 22, 48, 50 may originate from the top plane 18 or from the both plane 20 or at least one stepped structure 22, 48 may originate from the top plane 18 and at least one stepped structure 50 may originate from the bottom plane 20 (which is indicated in FIG. 1 as an option). Generally, the step color 30 refers the color of a declined section 38 or a plateau section 40 of a step 24. These sections may feature one or more colors and may be of the same or different colors. Different steps 24 of the stepped structure 22, 48, 50 may be designed identical or differently, according to the principles set out herein. Different stepped structures 22, 48, 50 may be designed identical or differently, according to the principles set out herein. The top 18 and bottom 20 plane may feature one or more colors, each. They may be of the same or different colors. Black and white are regarded as colors herein. Preferably, the step color 30 exhibits luminescence.

In an embodiment which can be implied by FIGS. 1 and 2, the contour 28 is closed in itself by running along the entire edge 42 of the card document 10.

In an embodiment further implied by FIGS. 1 and 3, that may be combined with any of the aforementioned embodiments or taken alone, the card document 10 may comprise a contour 28 that is closed in itself by being entirely surrounded by the top plane 18 or the bottom plane 20 from which it originates. As an example, a respective stepped structure 48 is show on the top plane 18 in FIG. 1. A detail B of FIG. 1 is shown from a viewing direction 52 in FIG. 3, wherein the contour 28, from where the declined section 38 of step 24 extends, is shown. The declined section 38 is followed by a plateau section 40. Preferably, a bottom 54 of the stepped structure 48 is directly exposed to the environment, as shown in FIG. 3. If the stepped structure 48 features more steps 24, the bottom 54 would lie deeper in the material of the card document 10.

Turning back to FIG. 1 and to another preferred but optional embodiment, the card document 10 may comprise at least two stepped structures 22, 48, 50, wherein a first stepped structure (e.g. stepped structure 22 or 48) comprises at least one step 24 originating from the top plane 18 and a second stepped structure (e.g. stepped structure 50) comprises at least one step 24 (not shown in detail, but following the same design principles as other steps 24) originating from the bottom plane 20 of the card document 10. Thus, the material thickness 26 of the card document 10 is locally reduced by each of the first and second stepped structure. A contour 28 that separates each of the first and second stepped structure from the respective top plane 18 or bottom plane 20 from which it originates is entirely surrounded by the respective top plane 18 or bottom plane 20. Further, the first stepped structure (e.g. stepped structure 22 or 48) and the second stepped structure (e.g. stepped structure 50) comprise a different geometry, as can be seen in FIG. 1.

In another embodiment, the contour 28 that separates the respective stepped structure 22 from the respective top plane 18 or bottom plane 20, at the same time, is forming part of the edge 42 of the card document 10. Further, the card document 10 may comprise the electronic element 36, wherein a shortest distance 56 between the contour 28 and the electronic element 36 is less than three quarters or less than half of a maximum extension 58 of the card document 10. In some embodiments, the shortest distance 56 is less than a third or less than a quarter of the maximum extension 58. There may be a cut-out 60 in the contour 28, arranged at a distance 62 from the electronic element 36. The distance 62 does not exceed once, twice or three times the length of the shortest distance 56. Unless indicated otherwise, the term "distance" always refers to a shortest possible distance between two features.

In an optional embodiment, the card document 10 comprises a plurality of layers 12, 14, as can be exemplarily seen in FIG. 2. The at least one step 24 is at least partially featuring a step color 30 different from a plane color 64 of at least one of the top plane 18 or the bottom plane 20. This is just as an example shown at the top plane 18 in FIG. 2. The step color 30 is achieved by the step 24 being at least partially formed by layer 14 (merely as an example) featuring a layer color that is different from a layer color of the layer 12 that at least partially forms the respective top plane 18 in this example. Thus, the plateau section 40 and the edge 42 may appear in the step color 30, while the declined section 38 and the top plane 18 may appear in the plane color 64. A desired layer color of the layers 12, 14 (or other layers) may be achieved by a material color of the respective layer 12, 14. It is also possible to achieve a desired step color 30 by a coating process, such as printing or painting.

In an optional embodiment, the card document 10 comprises a logo 66 formed by a stepped structure 22, 48, 50. This is only by means of example indicated in FIG. 1 at stepped structure 50.

In an optional embodiment, the card document 10 may comprise a stepped structure 22, 48, 50 that at least partially comprises a surface roughness being different from a surface roughness of the top plane 18 or bottom plane 20. For example, the bottom 54 shown in FIG. 3 could have a higher surface roughness than the top plane 18.

The stepped structure 22, 48, 50 of the card document 10 may be manufacturable by a material removing process, such as cutting, milling, grinding or the like. This way, different layers, as for example shown in FIG. 2 in case of layer 14, may be revealed from a plurality of superimposed layers 12, 14. For example, the plateau section 40 in FIG. 2 may be revealed by removing some material of layer 12. The layers 12, 14 may be superimposed foils, for example. Alternatively or in addition, the stepped structure 22, 48, 50 may be manufacturable by a forming process, such as molding, injection molding or embossing.

Other embodiments can include a card, such as an identity, loyalty or payment card, comprising an inclined or excavated edge surrounding the card or part of the surface of the card, wherein at least a part of the inclined or excavated edge or part of the surface of the card is coloured or in white, and wherein the revealed part can particularly be formed by means of a printing process or alternatively by way of superimposed foil layers, e.g. an upper layer which is not coloured and a lower layer which is coloured, the lower layer having a dimension in the direction of its length which is higher than the upper layer. The excavated part can be of different pattern, not being limited to excavating straight and smooth or on one level of excavation. It may comprise different deepness, with some roughness and does not need to follow any specific straight frame.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Details of the exemplary embodiments or other limitations described above should not be read into the claims absent a clear intention to the contrary. Any implementation described herein as exemplary is not necessarily to be construed as preferred or advantageous over other implementations, and the exemplary embodiments described herein are not intended to limit the scope or applicability of the subject matter in any way. Accordingly, it should be appreciated that the exemplary embodiment or embodiments described herein are not intended to limit the scope, applicability, or configuration of the claimed subject matter in any way. Rather, the foregoing detailed description will provide those with ordinary skill in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

It is claimed:

1. A card document comprising:
   one or more layers having a top plane, a bottom plane; and
      at least one stepped structure;
   wherein the stepped structure includes at least one step
      originating from the top plane or the bottom plane of
      the card document, which locally reduces a material
      thickness of the card document;
   wherein a contour that separates the stepped structure
      from the respective top plane or bottom plane is closed
      in itself and wherein the at least one step is at least
      partially featuring a step color different from a plane
      color of the top plane and the bottom plane,
   which is due to the step being at least partially formed by
      a layer of the card document having a layer color that
      is different from a layer color of a layer at least partially
      forming the respective top plane or bottom plane.

2. The card document of claim 1, wherein the card document comprises a plurality of layers.

3. The card document of claim 2, wherein the layer color of the layer at least partially forming the step is at least partially achieved by a material color of the layer.

4. The card document of claim 1, wherein the step color is at least partially achievable by a coating process.

5. The card document of claim 1, wherein a logo is formed by the stepped structure.

6. The card document of claim 1, wherein the stepped structure at least partially comprises a surface roughness being different from a surface roughness of the top plane or bottom plane.

7. The card document of claim 1, wherein the stepped structure is manufacturable by a material removing process.

8. The card document of claim 1, wherein the stepped structure is manufacturable by a forming process.

9. The card document according to claim 1, wherein the step color exhibits luminescence.

10. A card document comprising:

one or more layers having a top plane, a bottom plane and at least one stepped structure;

wherein the stepped structure includes at least one step originating from the top plane or the bottom plane of the card document, which locally reduces a material thickness of the card document;

wherein a contour that separates the stepped structure from the respective top plane or bottom plane is entirely surrounded by the top plane or the bottom plane from which it originates, and wherein a bottom of the stepped structure is directly exposed to the environment;

wherein the at least one step is at least partially featuring a step color different from a plane color of the top plane and the bottom plane, which is due to the step being at least partially formed by a layer of the card document featuring a layer color that is different from a layer color of a layer at least partially forming the respective top plane or bottom plane.

11. A card document comprising:

one or more layers having a top plane, a bottom plane and at least one stepped structure;

wherein the stepped structure comprises at least one step originating from the top plane or the bottom plane of the card document, which locally reduces a material thickness of the card document;

wherein a contour that separates the stepped structure from the respective top plane or bottom plane, at the same time, forms part of an edge of the card document, and an electronic element on the top plane or the bottom plane;

wherein a shortest distance between the contour and the electronic element is less than three quarters of a maximum extension of the card document;

wherein the at least one step is at least partially featuring a step color different from a plane color of the top plane and the bottom plane, which is due to the step being at least partially formed by a layer of the card document featuring a layer color that is different from a layer color of a layer at least partially forming the respective top plane or bottom plane.

\* \* \* \* \*